UNITED STATES PATENT OFFICE.

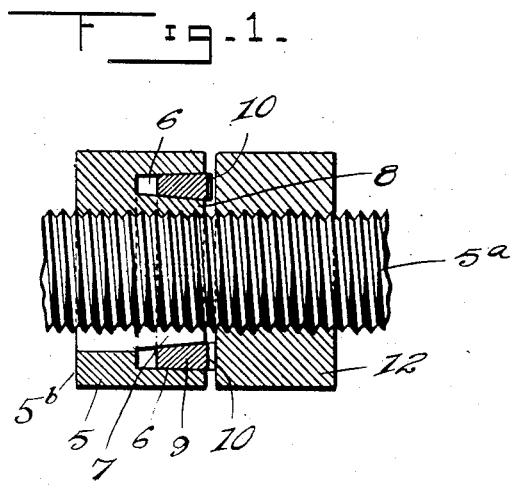
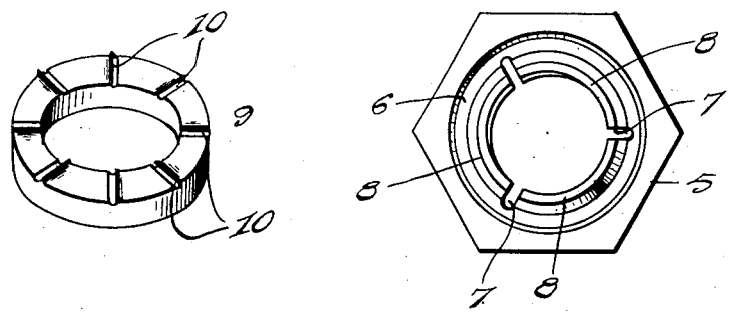
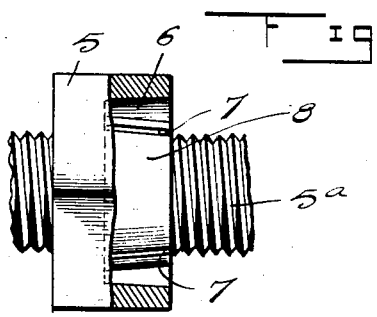

WILLIAM G. SAVIDGE, OF NORTHUMBERLAND, PENNSYLVANIA.

NUT-LOCK.

1,328,401.   Specification of Letters Patent.   Patented Jan. 20, 1920.

Application filed October 2, 1915, Serial No. 53,811. Renewed April 30, 1919. Serial No. 293,811.

*To all whom it may concern:*

Be it known that I, WILLIAM G. SAVIDGE, a citizen of the United States, residing at Northumberland, in the county of Northumberland and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut locks, and has for its object to provide a nut lock embodying essentially three elements, namely, a main nut, a jam nut and an interposed annular wedge element associated with the main nut for clamping the latter rigidly upon a bolt.

With this and other objects in view, the invention consists in the novel construction, arrangement and formation of parts as will be hereinafter specifically described, claimed and illustrated in the accompanying drawing, in which:

Figure 1 represents a longitudinal sectional view through the improved nut lock, Fig. 2 represents a side elevation, partly in section of the main nut, illustrating the locking element in side elevation, Fig. 3 represents an end elevation of the main nut, and Fig. 4 represents a perspective view of the locking element removed.

Referring to the drawing in detail, wherein similar reference numerals designate corresponding parts throughout the several views, the numeral 5 indicates the main nut having an annular groove 6 therein, the inner wall of which is formed with a plurality of slits 7 extending throughout the entire length of the bore of the nut and defining a plurality of clamping fingers 8, having their inner surfaces screwthreaded to present a continuation of the internal screw-threads of the nut 5. The inner surface or wall of the groove 6 is inclined with relation to the longitudinal axis of the nut, so that the fingers 8 are tapered outwardly.

An annular locking element, designated generally by the numeral 9, is seated in the groove 6 and is substantially wedge shaped in cross section, as clearly illustrated in Fig. 1, the inner surface thereof being beveled or inclined correspondingly to the inclination of the outer surfaces of the fingers 8. The outer surface of the annular locking element 9 is formed with a series of outwardly directed and radially disposed teeth 10. A jam nut 12 is threaded upon the bolt 5ª behind the main nut 5, and is adapted, when advanced, to engage the protruding portion of the annular locking element 9.

In the actual use of the nut lock, the main nut 5 is positioned so as to dispose the object-engaging face 5ᵇ thereof toward the object (not shown) and is advanced to the desired position upon the bolt 5ª and the annular locking element 9 is inserted in the annular groove 6. The nut 12 is subsequently fitted upon the bolt 5ª and advanced toward the main nut 5. As the nut 12 is advanced upon the screwthreads of the bolt the inner surface thereof comes into contact with the outer toothed surface of the annular locking element 9 and forces the latter inwardly, thus compressing or moving the fingers 8 of the main nut into clamped engagement with the bolt 5ª and reliably locking the main nut against rotational movement. The teeth 10 of the annular locking element 9 are so disposed as to lock the nut 12 against rotational movement in a direction to remove it from the bolt. Owing to the peculiar tapered formation of the fingers 8, it is evident that the relatively small ends thereof are firmly held against screw threads of the bolt 5 and, owing to their position with relation to the object it is evident that the nut 5 is firmly held against retrograde movement upon the bolt.

What I claim is:

1. A nut lock including a main nut having an annular groove, the inner wall of said groove and the adjacent portion of the wall of the bore of the nut being formed with slits extending throughout the entire length of the bore of the nut and defining a plurality of fingers, and an annular locking element engaged in said groove.

2. A nut lock including a main nut having an annular groove in the outer face thereof, the inner wall of said groove having a plurality of slits extending throughout the entire length of the bore of the nut and defining a plurality of fingers, said fingers being tapered outwardly from the object-engaging face of the nut, an annular locking element engaged in said groove having an inclined inner surface engaged with said fingers, means independent of said nut and said locking element for moving the latter into said groove and compressing said fingers, and teeth formed on the outer face of the locking element engaging and securing said means.

In testimony whereof I affix my signature in presence of two witnesses.

WILLIAM G. SAVIDGE.

Witnesses:
RAY E. JOHNSON,
N. S. JOHNSON.